(12) United States Patent
Rammhofer et al.

(10) Patent No.: US 7,003,951 B2
(45) Date of Patent: Feb. 28, 2006

(54) HYDRAULIC SYSTEM

(75) Inventors: Thomas Rammhofer, Sasbach (DE); Udo Popp, Buehl (DE); Matthias Zink, Ottenhoefen (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 32 days.

(21) Appl. No.: 10/775,788

(22) Filed: Feb. 10, 2004

(65) Prior Publication Data

US 2004/0187493 A1    Sep. 30, 2004

(30) Foreign Application Priority Data

Feb. 12, 2003  (DE) ................. 103 05 677

(51) Int. Cl.
*B60T 13/20* (2006.01)
(52) U.S. Cl. ......................... 60/557; 138/111
(58) Field of Classification Search ................ 60/533, 60/557; 138/111, 177
See application file for complete search history.

(56) References Cited

U.S. PATENT DOCUMENTS

| | | | | |
|---|---|---|---|---|
| 1,906,855 A * | 5/1933 | Heyl | ............................ | 138/177 |
| 3,330,113 A * | 7/1967 | Perrino | ........................ | 60/537 |
| 3,524,661 A | 8/1970 | Farnam | ....................... | 285/239 |
| 3,837,166 A * | 9/1974 | Hiraoka | ........................ | 60/533 |
| 4,617,213 A * | 10/1986 | Asano et al. | ................ | 138/141 |
| 4,699,178 A * | 10/1987 | Washkewicz et al. | ........ | 138/125 |
| 4,966,202 A | 10/1990 | Bryan et al. | ................. | 138/172 |
| 4,998,564 A | 3/1991 | Igaraschi et al. | ............ | 138/126 |
| 5,037,142 A | 8/1991 | Helping | ........................ | 285/256 |
| 5,476,121 A | 12/1995 | Yoshikawa et al. | ......... | 138/138 |
| 5,507,320 A | 4/1996 | Plumley | ....................... | 138/126 |
| 5,918,640 A * | 7/1999 | Orcutt | ........................ | 138/109 |
| 5,918,643 A | 7/1999 | Roloff et al. | ................ | 138/137 |
| 6,148,848 A | 11/2000 | Freed | ........................... | 137/312 |
| 6,247,763 B1 * | 6/2001 | Rehn et al. | ................. | 138/137 |
| 6,446,436 B1 | 9/2002 | Winkelmann et al. | ......... | 60/533 |
| 6,564,918 B1 * | 5/2003 | Itoh | ......................... | 192/85 C |
| 2001/0017163 A1 | 8/2001 | Penza | ........................... | 138/98 |
| 2002/0119055 A1 | 8/2002 | Heller et al. | ................. | 417/316 |

FOREIGN PATENT DOCUMENTS

| | | |
|---|---|---|
| DE | 1165947 | 3/1964 |
| DE | 10049913 | 4/2001 |
| EP | 0643095 | 3/1995 |
| EP | 0754898 A1 | 1/1997 |
| EP | 0754898 B1 | 5/1998 |
| FR | 2089897 | 1/1972 |
| GB | 1076819 | 7/1967 |
| WO | 0077433 | 12/2000 |

\* cited by examiner

*Primary Examiner*—Thomas E. Lazo
(74) *Attorney, Agent, or Firm*—Davidson, Davidson & Kappel, LLC

(57) ABSTRACT

In a hydraulic system (1) for motor vehicles in particular, comprising a master cylinder (4), a slave cylinder (5) and a hydraulic medium line (15) connecting the two, the flexibility and hydraulic rigidity are improved by the fact that the hydraulic medium line (15) includes at least two sections (16, 17, 20, 21, 22, 23, 24, 25, 26, 27, 28, 29, 30) having different wall thicknesses. A feeder line or hydraulic medium line with an inert inner material layer and a transfer device with two interconnected pipes running in parallel are also disclosed.

24 Claims, 3 Drawing Sheets

HYDRAULIC SYSTEM

This claims the benefit of German Patent Application No. 103 05 677.7, filed Feb. 12, 2003 and hereby incorporated by reference herein.

BACKGROUND INFORMATION

The present invention relates to a hydraulic system, in particular for motor vehicles, including a master cylinder, a slave cylinder and a hydraulic medium line connecting them as well as a disengaging system for actuating a plurality of friction clutches in a drive train of a motor vehicle including a plurality of master units, a plurality of slave units and transfer devices, each including at least one pipe in which a force transfer medium flows, connecting these in pairs.

A generic hydraulic system is known from German Patent Application No. 100 49 913 A1, for example. The hydraulic medium line connects the master cylinder, which is permanently mounted on the vehicle body, to the slave cylinder, which is permanently mounted on the transmission. The hydraulic medium line is manufactured today mainly from steel pipe. To equalize the joint movement of the engine and the transmission and to suppress the transmission of vibration and/or noise, the pressure line includes a section having a rubber hose. If a vehicle model has both right-hand and left-hand steering versions, the lines will be of different lengths. With right-hand steering, these lines are 1.5 meters long or more. To reduce costs, there have been attempts to replace the steel-rubber line with a plastic line. So far this has been possible up to a length of approximately 700 millimeters, but the main disadvantage is the increase in volume of the plastic line due to expansion as a function of temperature, which results in a displacement of the coupling points. Therefore, different wall thicknesses are used depending on the line length. The greater the line length, the greater is the wall thickness. A disadvantage with the greater wall thickness is the greater rigidity of the line, which has a negative effect on the required flexibility for equalization of engine-transmission movement and noise transmission. At line lengths of more than 700 millimeters in particular, the disadvantages described above are so pronounced that they may result in a significant loss of comfort, and therefore plastic tubing today is combined with an additional steel line.

BRIEF SUMMARY OF THE INVENTION

An object of the present invention is therefore to compensate for and/or reduce the disadvantages described above.

The present invention provides a hydraulic system for motor vehicles in particular, including a master cylinder, a slave cylinder and a hydraulic medium line connecting the two, the hydraulic medium line including at least two sections having different wall thicknesses. Line portions permanently mounted on the body as well as the line portions that are permanently mounted on the transmission but which need not be flexible themselves are made of a plastic tubing having a relatively large wall thickness, which therefore widens only slightly even when acted upon by the operating pressure of the hydraulic medium and therefore has a high hydraulic rigidity. Areas in which the hydraulic medium line must be capable of bending (this includes in particular the transition between the line part permanently mounted on the body and the line part permanently mounted on the transmission) are made of plastic tubing having a relatively small wall thickness, thus ensuring a relatively low flexural rigidity and thus easy bendability. The term sections, as used here, is understood to refer to areas of pipeline situated axially in succession one after the other. The sections are preferably made of plastic, in particular preferably made of a single identical plastic, which may be either a thermoplastic or a thermoset plastic. A thermoplastic material is preferred. The sections are preferably manufactured in one piece, and all the sections of the hydraulic medium line are manufactured in one continuous operation, or in successive operations. However, it is also possible to manufacture different sections at first independently and then join them by ultrasonic welding, for example. The hydraulic medium line is preferably produced in one piece in an extrusion operation. By intervening in the manufacturing process, e.g., by varying the draw-off speed, it is possible to have a controlled influence on the wall thickness. Any number of sections may be used, but there should be at least two sections. Depending on the installation situation, in particular aspects of simplified assembly of the hydraulic medium line may necessitate additional flexible sections and additional degrees of freedom so that more than two different sections may be used. When more than two different sections are used, areas of thicker and thinner wall thicknesses may alternate, or a plurality of sections of different wall thicknesses may also be used. Thus any desired gradation in the wall thickness of the individual sections may be used and more than two wall thicknesses may be used. The wall thickness of the sections and the section length may be used in a controlled manner to accommodate the volume. The goal here is to accommodate the same volume and/or to achieve the same hydraulic rigidity of the hydraulic medium line in the case of a short line of a left-hand drive vehicle as with the comparatively long hydraulic medium line in a right-hand drive vehicle. Through a purposeful arrangement of the individual sections, the transmission of vibration and/or noise may also be influenced. The inside diameter of the sections is in principle the same everywhere, so that a favorable flow characteristic is achieved. Instead of a hydraulic medium line manufactured of plastic in one piece and having a plurality of sections, it is also possible to have sections of plastic alternating with sections made of metal. Sections made of metal may include grooves, scoring, flanging, crimping or the like at the ends so that they may be joined with the plastic sections of the line by directly encapsulating with plastic.

Only special rubber or plastic materials are resistant to the fluids used in hydraulic brake systems or clutch disengaging systems. Thus a suitable choice of the material is crucial for the functioning of the entire hydraulic system. For example, if the materials selected are not resistant to the fluid, this will result in turbidity of the fluid. The feeder hoses used in the usual hydraulic systems are mainly made of rubber and therefore are not resistant to all media. A corrugated tube made of plastic has this resistance. Connecting elements made of rubber which also have a limited resistance to hydraulic fluid are a disadvantage.

Therefore another object of the present invention is to provide a pressure line and/or a feeder line for a hydraulic system which is inexpensive to manufacture and is resistant to the fluids used in the hydraulic system.

The present invention also provides a hydraulic system, in particular for motor vehicles, including a master cylinder, a slave cylinder and a hydraulic medium line connecting them, with the master cylinder being connected to a feeder line made of a composite material having an inside layer of a hard material that is inert to mineral oil and/or hydraulic fluids. The feeder line is connected in a known way to a feeder tank. Hydraulic fluid may be resupplied from the feeder tank into the hydraulic system through the feeder line and a corresponding feeder borehole or feeder grooves or the like in the master cylinder in a no-load position of the master cylinder, also known as a blow position, in which the pressure cylinder of the master cylinder has a blow play. Composite material is understood to refer to any material composed of multiple layers. The material which is inherently inert to mineral oil and/or hydraulic fluid may preferably be a nylon film.

The composite material preferably includes a layer of an elastic material which absorbs the tensile forces, i.e., forces originating from the inside pressure of the hydraulic system. In addition, the composite material may include a layer of a material with a high tensile strength with respect to the elastic material. The composite material may include for example a layer of a metal fabric and/or a glass fabric and/or a carbon fiber fabric and/or an Aramid fiber fabric. These fabrics absorb tensile stresses, whereas the elastic material, e.g., a rubber, a plastic or the like together with the fabric forms a matrix stabilizing it. The feeder line thus is preferably made of a composite material having an inner barrier layer, a rubber layer above that, a pressure backing layer and an outer rubber layer. However, the feeder line is composed at least of a composite material having an inner barrier layer and an outer rubber layer.

In addition to the feeder lines, the hydraulic medium line itself may be made of a composite material corresponding to the feeder line described above. The pairing of materials and/or the geometries are also to be coordinated with the pressure conditions in a hydraulic medium line. Thus materials of a greater strength and/or sufficiently great wall thickness are to be provided for the hydraulic medium line.

The present invention also relates to a clutch disengaging system for actuation of a plurality of friction clutches in a drive train of a motor vehicle, including a plurality of master units, a plurality of slave units, and transfer devices connecting them in pairs, each having at least one pipe in which a transfer medium is carried. The power transfer medium may be hydraulic fluid in a known way or it may also be wire cable as part of a Bowden cable. If a plurality of clutches are to be operated with one clutch disengaging system (for example, this applies to double-clutch transmissions), this increases the installation costs for the transfer devices. A transfer device must be installed between each master unit and each slave unit.

Therefore, an additional object of the present invention is to simplify assembly in the case of multiple master/slave units. The present invention provides a clutch disengaging system for actuation of a plurality of friction clutches in a drive train of a motor vehicle including a plurality of master units, a plurality of slave units and transfer devices connecting them in pairs, each including at least one pipe in which a force transfer medium is carried, where the transmission device is designed at least in part as interconnected pipes running in parallel. This means at least partially that the transmission device may usually run only individually in the area of the master unit and/or the slave unit to permit a connection to the master unit and/or slave unit. Depending on the installation situation, however, it may also be advantageous to separate the pipes which are actually combined together, e.g., to limit the required installation space or to allow the installation of additional elements in between, e.g., vibration filters or the like.

In a double clutch in particular, it is advantageous if at least two pipes are permanently connected. If more than two clutches are permanently connected, more than two pipes may also be permanently connected. It is advantageous if at least two pipes are permanently connected along a connecting line running axially, which may preferably be a web running axially. The cross section of the connected pipes is thus approximately in the shape of a figure eight and resembles the cross section of a dumbbell. The web running axially may be continuous in the axial direction, which is particularly easy to manufacture in an extrusion operation, or as an alternative it may also be interrupted, which results in savings of material and also weight savings, although minor.

According to one embodiment of this invention, the transfer devices are designed as hydraulic medium lines, the master units as master cylinders and the slave units as slave cylinders, with the force transfer medium being a fluid. In this design, it is possible to run at least two pipes coaxially. It is advantageous if the hydraulic resistance, i.e., the pressure drop in the individual coaxially running pipes is approximately identical. If clutches of different strengths are operated, the cross sections of the axially guided pipes may be adapted to the clutch force and/or fluid quantities required in each case.

BRIEF DESCRIPTION OF THE DRAWINGS

Exemplary embodiments of the present invention are explained in greater detail below on the basis of the accompanying drawing, in which.

DETAILED DESCRIPTION

Figure 1:
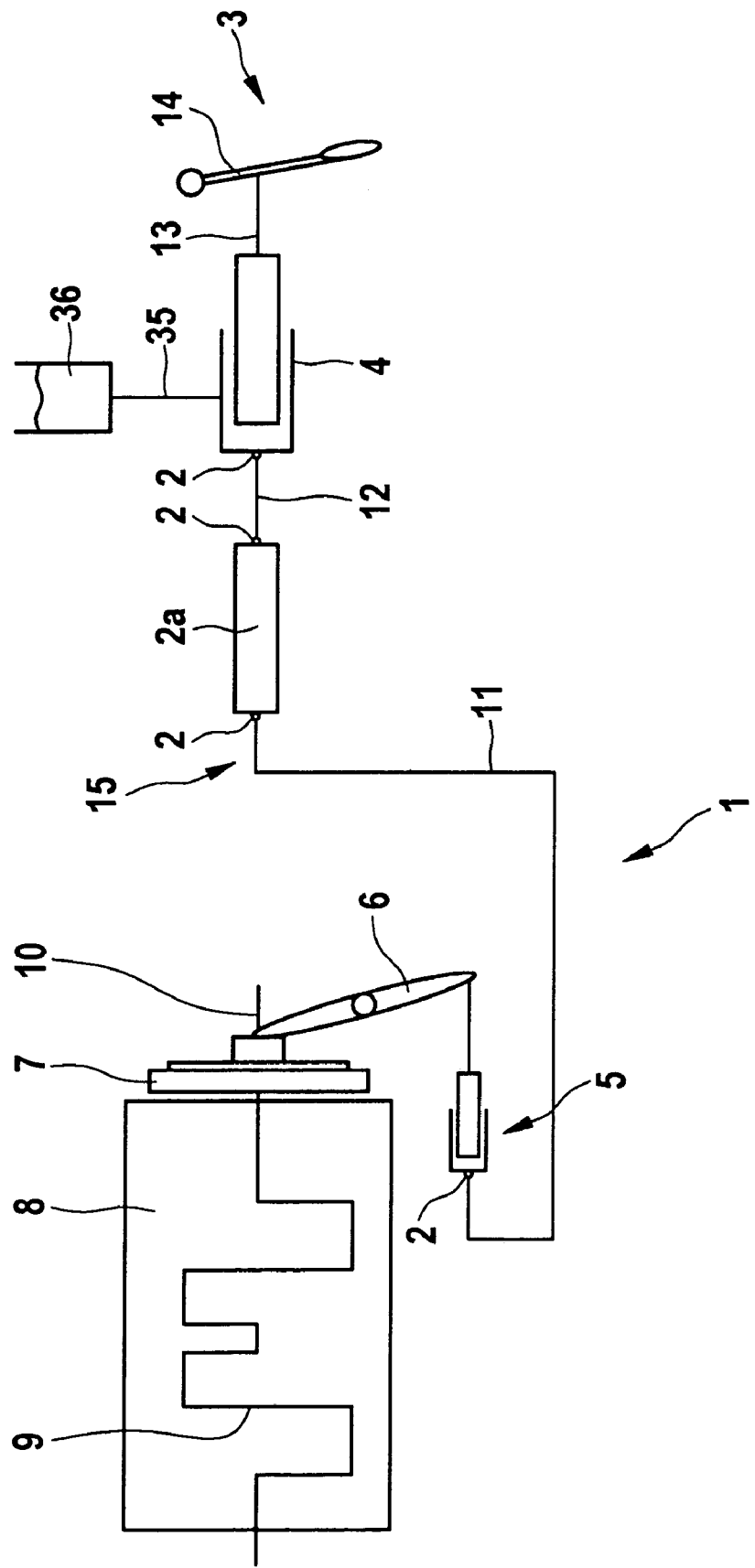
FIG. 1 shows a schematic diagram of a hydraulic system on the basis of an exemplary embodiment of a clutch-disengaging device

FIG. 1 shows a schematic diagram of a possible embodiment of a hydraulic system on the basis of a clutch-disengaging device 3 having a master cylinder 4 and a slave cylinder 5. At least one plug connection 2 is installed in a hydraulic medium line 15 connecting these two cylinders in the exemplary embodiment depicted here, and it may separate them into a first line section 11 and a second line section 12, for example. It is self-evident that in other exemplary embodiments plug connection 2 may also be provided on master cylinder 4 or on slave cylinder 5. In addition, at the same time the function of a pressure limiting valve (peak torque limiter PTL) and/or a vibration damper, e.g., a so-called vibration filter, may be integrated into the plug connection.

Clutch disengaging system 3 actuates clutch 7 hydraulically by having master cylinder 4 acted upon by an actuation element 14, which may be a foot pedal, an actuator, e.g., an electric actuator or the like. In this way, pressure is built up via a mechanical transmission 13 in master cylinder 4, which in turn builds up a pressure in slave cylinder 5 via hydraulic medium line 15 and/or second line strand 12, plug connection 2 and first line strand 11. Slave cylinder 5 may be situated concentrically around transmission input shaft 10, as in the example shown here, and may be supported axially on a transmission housing and may apply the required disengaging force to clutch 7 and/or its disengaging elements such as plate springs via a disengaging bearing. Other exemplary embodiments may include a slave cylinder 5 which actuates a disengagement device via a disengaging mechanism and is situated outside of the clutch bell, which acts axially on the disengaging mechanism via a piston situated in the slave cylinder casing and in hydraulic connection with the master cylinder. To apply the disengaging force, the slave cylinder is mounted permanently on the transmission housing or on some other component permanently mounted on the housing. Transmission input shaft 10 transmits the torque of internal combustion engine 8 to a transmission when clutch 7 is engaged and then transmits it to the driving wheels of a motor vehicle.

Due to the combustion processes taking place in internal combustion engine 8, crankshaft 9 is exposed to uneven loads as a function of the design of internal combustion engine 8, e.g., as a function of the number of cylinders, these loads being manifested in axial and/or tumbling vibrations thereof and being transmitted via disengaging mechanism 6 to slave cylinder 5, hydraulic medium line 15 to master cylinder 4 and from there via mechanical transmission 13 to operating element 14. In the case of a clutch pedal as the actuating element, these vibrations are perceived as unpleasant. In the case of an actuator as an actuating element 14, for example, reduced regulating accuracy or a shortened lifetime may be the result of such vibration. A vibration filter integrated into plug connection 2, for example, is therefore switched on for attenuation in hydraulic medium line 15 and is tuned to a attenuate the vibrations introduced by crankshaft 9. The frequency range of such vibrations is typically 50 Hz to 200 Hz.

Figure 2:
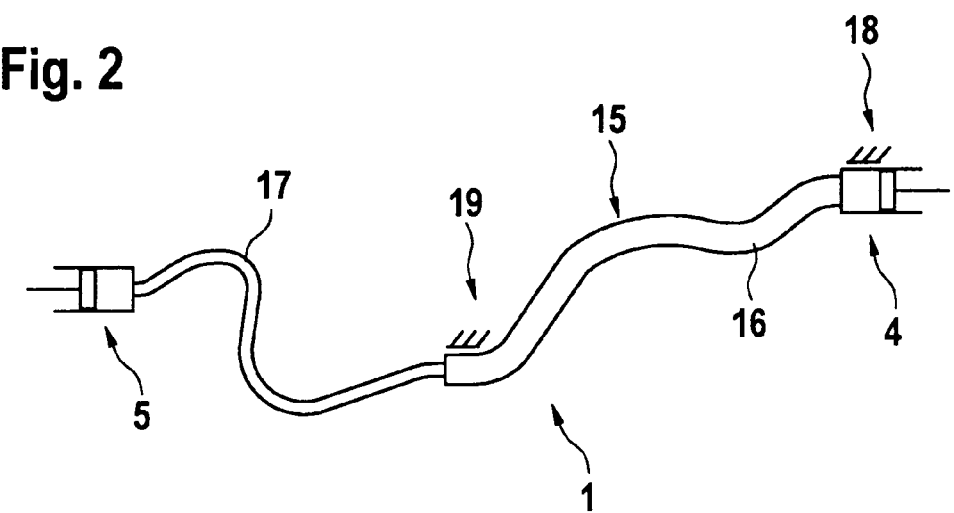
FIG. 2 shows a diagram of a hydraulic system having a two-section hydraulic medium line.

FIG. 2 shows a hydraulic system 1 having a master cylinder 4 and a slave cylinder 5 as well as a hydraulic medium line 15 which connects the two and, as shown in FIG. 1, a fluid reservoir 36, which is connected to master cylinder 4 via a feeder line 35. Hydraulic medium line 15 is composed of a first section 16, which is permanently mounted on the body, and a second section 17, which is permanently mounted on the transmission. Installation of first section 16, permanently mounted on the body, is indicated by bearing locations 18 and 19. First section 16 of hydraulic medium line 15 permanently mounted on the body practically does not move at all during operation, i.e., it is essentially rigidly installed inside the vehicle. Second section 17, which is permanently mounted on the transmission, undergoes deformation during operation, and slave cylinder 5, permanently mounted on the transmission, executes essentially the same movements as the transmission which is mounted in the vehicle using spring elements and damping elements. Therefore, second section 17, which is permanently mounted on the transmission, is deformed, e.g., due to vibration or to large deflecting movements of slave cylinder 5 with respect to the vehicle body. Section 16, which is permanently mounted on the vehicle body, of hydraulic medium line 15 has a greater wall thickness than section 17, which is permanently mounted on the transmission and therefore experiences very little or no deformation; section 17 is easily i.e., more easily deformable due to its small wall thickness. Due to the different wall thicknesses, a corresponding great flexibility of hydraulic medium line 15 may be achieved in the area in which hydraulic medium line 15 is bent during operation due to the relative movement of the transmission in relation to the vehicle body, and in areas where there need not be any bending a high hydraulic rigidity is retained.

Figure 3:
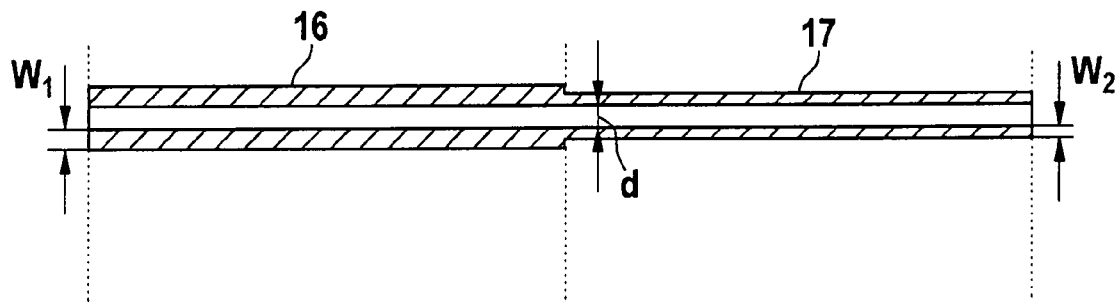
FIG. 3 shows a section through part of a hydraulic medium line.

FIG. 3 shows a partial sectional view through a hydraulic medium line 15, showing first section 16 permanently secured on the body and having a wall thickness $W_1$ and second section 17 permanently secured on the transmission and having a wall thickness $W_2$. Wall thickness $W_1$ is greater than wall thickness $W_2$, and the diameter of first section 16 is also greater than the diameter of second section 17 accordingly. Inside diameter d of first section 16 and second section 17 is approximately identical in the two regions. Hydraulic medium line 15 may be produced in one piece in an extrusion process, for example. By intervening in the manufacturing process, e.g., by varying the draw-off speed, the wall thickness is controllable in a targeted manner. Any number of sections may be used, but there should be at least two sections.

Figure 4:
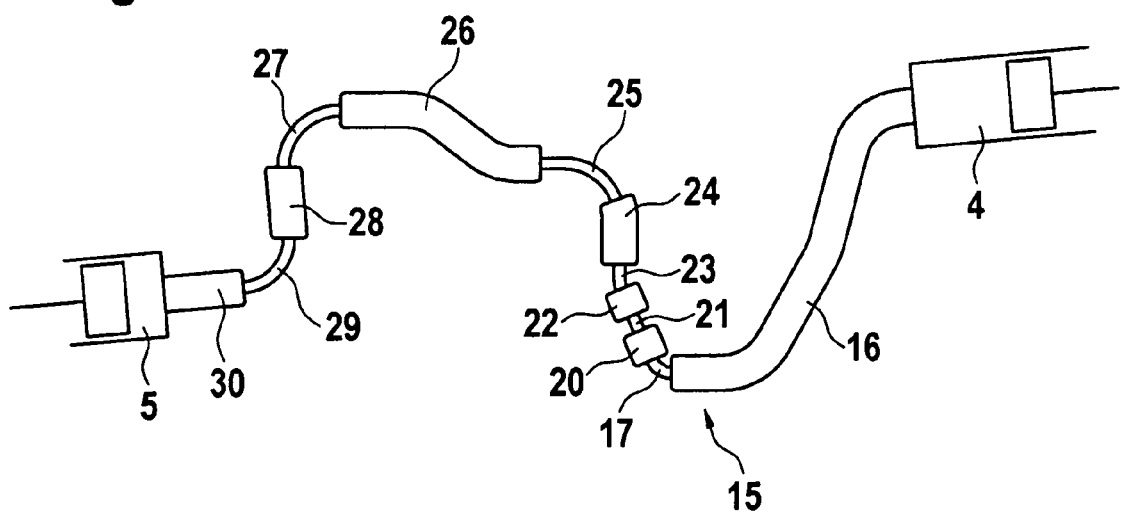
FIG. 4 shows a diagram of a hydraulic system having a multisection hydraulic medium line.

FIG. 4 shows a hydraulic medium line 15 having a first section 16, a second section 17 and additional sections 21, 22, 23, 24, 25, 26, 27, 28, 29, 30. Additional sections 20 to 30 may each have outside and inside diameters corresponding to those of first section 16 and/or second section 17, or they may also be manufactured with different wall thicknesses. However, it is advantageous if inside diameter d of all sections 16, 17 as well as sections 20 to 30 is identical if possible. Through the use of alternating sections having large and small wall thicknesses, it is possible to provide articulated regions in hydraulic medium line 15 in which this line is freely movable and presents little resistance to a bending or similar movement and also to provide other regions in which rigidity with respect to widening caused by the hydraulic pressure is very great so that on the whole the entire line has a greater rigidity with respect to widening caused by the inside pressure than would be the case with the use of a hydraulic medium line 15 having a thin wall in all areas. As an alternative, first section 16 as well as second section 17 and additional sections 20–30, they may also be made of metal or rubber or the like instead of plastic. In particular, the sections that are not to be bent, e.g., second section 17 mounted permanently on the transmission may be manufactured of metal, for example. However, according to the preferred embodiment, the entire hydraulic medium line 15 is manufactured of individual sections which are made of plastic and manufactured in one piece if possible.

Hydraulic medium line 15 according to FIG. 1 or FIGS. 2 through 3 may be made of a composite material having an inner layer of a material that is inert with respect to mineral oils and/or hydraulic fluids. The term composite material is understood to refer to a tubular material having a layered structure. The layers are usually in a concentric configuration around the central axis. Since the inside surface of the hydraulic medium line is constantly in contact with mineral oil or hydraulic fluid, it is advantageous or even indispensable for this surface to be able to withstand mineral oil or hydraulic fluid at least over the required lifetime of the hydraulic system. For example, the inside surface may be made of a thin layer of a nylon film. The inside surface need not necessarily have a great mechanical strength. The transmission of mechanical forces and in particular the uptake of pressure forces occurring in the interior of the pressure line may be accomplished through another layer of the composite material, e.g., an elastic material. For example a material of a high tensile strength, e.g., a woven fabric such as a metal fabric, a fiberglass fabric, a carbon fiber fabric or an Aramid fiber fabric or the like may be embedded in the elastic material. This yields a multicomponent structure, the innermost layer being an inert film or an inert material, the next layer situated toward the outside being made of rubber, for example, followed by a layer of metal, fiberglass, carbon fiber or Aramid fiber fabric, and finally the outer layer is again formed by a rubber layer or the like. The fiber fabric mentioned above forms a pressure-absorbing layer and the fiber fabric has a very high tensile load bearing capacity and therefore essentially absorbs all the tensile forces originating from the inside pressure within the hydraulic medium line.

Figure 5:
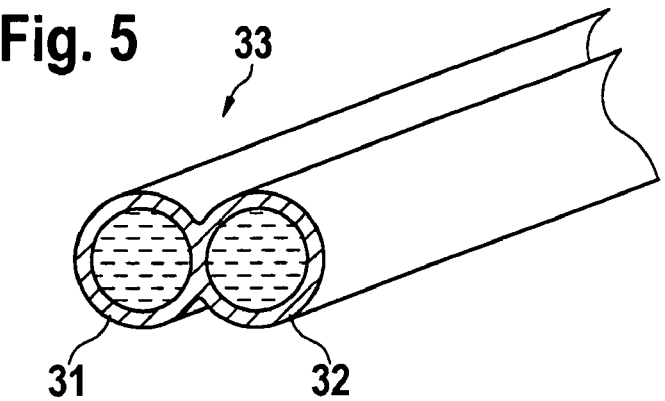
FIG. 5 shows a section through a first exemplary embodiment of a hydraulic medium line.
Figure 6:
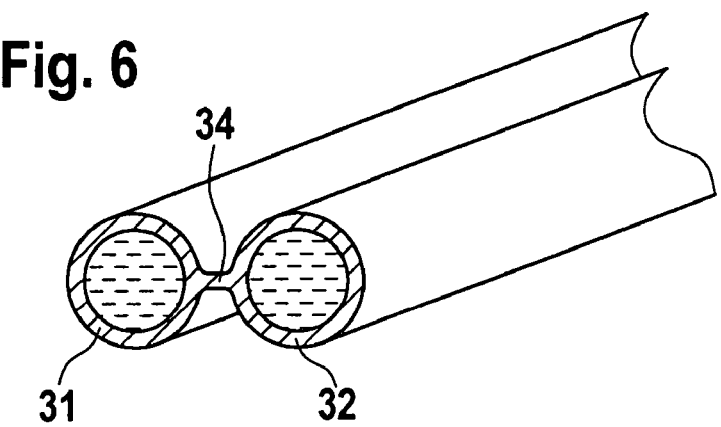
FIG. 6 shows a section through a second exemplary embodiment of a hydraulic medium line.
Figure 7:
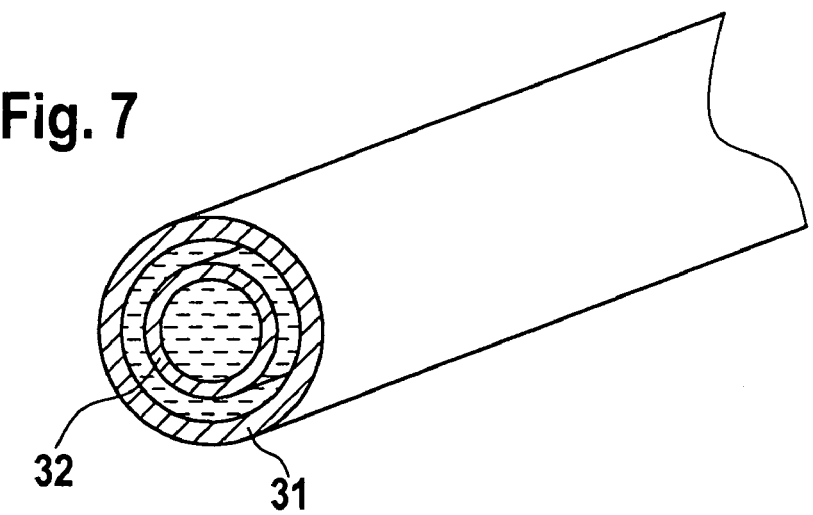
FIG. 7 shows a section through a third exemplary embodiment of a hydraulic medium line.

FIGS. 5, 6 and 7 show different exemplary embodiments of pipes in which a power transfer medium is carried. These may be, for example, hydraulic medium lines of a hydraulic system; likewise, cables corresponding to Bowden cables may also run in the pipes. Such pipes are used in particular in double-clutch transmissions, for example, in which a plurality of master units must actuate a plurality of slave units, with the master units being situated so they are spatially offset from the slave units. The master units may be mechanical actuators or hydraulic cylinders, for example, and the slave units may be, for example, slave cylinders or corresponding mechanical elements which are actuated by a cable. Instead of individual lines being laid individually, two lines may be laid in one installation in the exemplary embodiments depicted in FIGS. 5 through 7. Accordingly, the exemplary embodiments may also be expanded by adding additional lines. FIG. 5 shows an exemplary embodiment in which two hydraulic lines or the like have been manufactured jointly, e.g., in an extrusion method or the like and which have a cross section in the form of a figure eight on the whole. A first pipe 31 and a second pipe 32 on the whole form a transfer device 33, with first and second pipes 31 and 32 forming a hydraulic medium line of a hydraulic system. FIG. 6 shows an alternative embodiment in which first and second pipes 31, 32 are connected by a web 34. Finally FIG. 7 shows an alternative embodiment in which first pipe 31 and second pipe 32 are in a concentric configuration. This configuration is advantageously such that the cross-sectional areas of the two pipes, in other words the areas through which hydraulic fluid may flow, are approximately the same or induce at least approximately the same flow resistance and/or pressure drop when a fluid flows in them. The embodiments according to FIGS. 5 and 6 are likewise suitable for carrying a wire or the like as a direct mechanical transfer device. FIG. 7 may be applied logically only in conjunction with hydraulic systems.

LIST OF REFERENCE SYMBOLS 1 hydraulic system
2 plug connection
2a pressure limiting valve
3 clutch disengaging device
4 master cylinder
5 slave cylinder
6 disengaging mechanism
7 clutch
8 internal combustion engine
9 crankshaft
10 transmission input shaft
11 first line strand
12 second line strand
13 mechanical transfer
14 actuating element
15 hydraulic medium line
16 first section (permanently mounted on the body)
17 second section (permanently mounted on the transmission)
18 bearing site
19 bearing site
$W_1$ wall thickness of first section
$W_2$ wall thickness of second section
20 to 30 additional sections
31 first height
32 second height
33 transfer device
34 web
35 feeder line

What is claimed is:

1. A hydraulic system comprising:
   a master cylinder;
   a slave cylinder; and
   a hydraulic medium line connecting the master cylinder and the slave cylinder,
   the hydraulic medium line including a first section and a second section, the first and second sections having different wall thicknesses; wherein the first and second sections are manufactured in one piece.

2. The hydraulic system as recited in claim 1 wherein the first section is made of synthetic material.

3. The hydraulic system as recited in claim 1 wherein the first section is made of synthetic material and an additional section is made of metal.

4. The hydraulic system as recited in claim 1 wherein inside diameters of the first and second sections are similar.

5. The hydraulic system as recited in claim 1 wherein outside diameters of the first and second sections are similar and inside diameters are different.

6. The hydraulic system as recited in claim 1 wherein the hydraulic system is a motor vehicle hydraulic system.

7. A hydraulic system for actuating a motor vehicle clutch comprising:
   a master cylinder;
   a slave cylinder connected to the motor vehicle clutch; and
   a hydraulic medium line connecting the master cylinder and the slave cylinder,
   the hydraulic medium line and/or a feeder line connected to the master cylinder being made of a composite material having an inner layer of a material inert with respect to mineral oil and/or hydraulic fluid.

8. The hydraulic system as recited in the claim 7 wherein the inner layer is a nylon film.

9. The hydraulic system as recited in claim 7 wherein the composite material includes a layer of an elastic material.

10. The hydraulic system as recited in claim 7 wherein the composite material includes a layer of a material having a high tensile strength in comparison with the elastic material.

11. The hydraulic system as recited in claim 7 wherein the material having a high tensile strength is a woven fabric.

12. The hydraulic system as recited in claim 7 wherein the composite material includes a layer of a metal fabric and/or a fiberglass fabric and/or carbon fiber fabric and/or an aramid fiber fabric.

13. The hydraulic system as recited in claim 7 further comprising the feeder line and wherein the feeder line is made of a composite material having an inner barrier layer, a rubber layer situated above it, a pressure-bearing layer, and an outer rubber layer.

14. The hydraulic system as recited in claim 7 wherein the feeder line is made of a composite material having an inner barrier layer and an outer rubber layer.

15. The hydraulic system as recited in claim 7 wherein the hydraulic system is a motor vehicle hydraulic system.

16. A disengaging system for actuating a plurality of clutches in a drive train of a motor vehicle, the disengaging system comprising:
a plurality of master units;
a plurality of slave units connected to the plurality of clutch in the motor vehicle; and
transfer devices connecting the master units and slave units to define a master unit slave unit pair,
each transfer device including two interconnected pipes for carrying a power transfer medium, the interconnected pipes running in parallel.

17. The disengaging system as recited in claim 16 wherein the interconnected pipes are permanently connected.

18. The disengaging system as recited in claim 17 wherein the interconnected pipes are permanently connected by an axially-running connecting line.

19. The disengaging system as recited in claim 18 wherein the connecting line is a web.

20. The disengaging system as recited in claim 16 wherein the interconnected piped run coaxially.

21. The disengaging system as recited in claim 16 wherein the transfer devices are designed as hydraulic medium lines, the master units are designed as master cylinders and the slave units are designed as slave cylinders, the power transfer medium being a fluid.

22. The disengaging system as recited in claim 16 wherein the transfer devices are hydraulic transfer devices.

23. A hydraulic system comprising:
a master cylinder;
a slave cylinder; and
a hydraulic medium line connecting the master cylinder and the slave cylinder, the hydraulic medium line including a first section and a second section, the first and second sections having different wall thicknesses,
the first section being made of synthetic material and the second section or an additional section is made of metal.

24. A hydraulic system comprising:
a master cylinder;
a slave cylinder; and
a hydraulic medium line connecting the master cylinder and the slave cylinder, the hydraulic medium line including a first section and a second section, the first and second sections having different wall thicknesses,
inside diameters of the first and second sections being similar.

* * * * *

UNITED STATES PATENT AND TRADEMARK OFFICE
CERTIFICATE OF CORRECTION

| | | |
|---|---|---|
| PATENT NO. | : 7,003,951 B2 | Page 1 of 1 |
| APPLICATION NO. | : 10/775788 | |
| DATED | : February 28, 2006 | |
| INVENTOR(S) | : Thomas Rammhofer, Udo Popp and Matthias Zink | |

It is certified that error appears in the above-identified patent and that said Letters Patent is hereby corrected as shown below:

Column 9, lines 7 and 8 should read "a plurality of master units;
a plurality of slave unites connected to the plurality of clutches in the drive train of the motor vehicle; and "
instead of
"a plurality of slave units connected to the plurality of clutch in the motor vehicle; and".

Column 9, line 22 should read "the interconnected pipes run coaxially." instead of "the interconnected piped run coaxially."

Signed and Sealed this

Twenty-ninth Day of August, 2006

JON W. DUDAS
*Director of the United States Patent and Trademark Office*